US012649235B2

(12) United States Patent
Koga et al.

(10) Patent No.: US 12,649,235 B2
(45) Date of Patent: Jun. 9, 2026

(54) TECHNIQUES FOR ADAPTIVE ROBOTIC ASSEMBLY

(71) Applicant: AUTODESK, INC., San Francisco, CA (US)

(72) Inventors: Yoshihito Yotto Koga, Mountain View, CA (US); Sachin Chitta, Palo Alto, CA (US); Heather Kerrick, Berkeley, CA (US)

(73) Assignee: AUTODESK, INC., San Francisco, CA (US)

( * ) Notice: Subject to any disclaimer, the term of this patent is extended or adjusted under 35 U.S.C. 154(b) by 213 days.

(21) Appl. No.: 18/152,980

(22) Filed: Jan. 11, 2023

(65) Prior Publication Data

US 2023/0278213 A1      Sep. 7, 2023

Related U.S. Application Data

(60) Provisional application No. 63/315,451, filed on Mar. 1, 2022.

(51) Int. Cl.
B25J 9/16          (2006.01)
B25J 19/02          (2006.01)

(52) U.S. Cl.
CPC ............. B25J 9/1664 (2013.01); B25J 9/161 (2013.01); B25J 9/1612 (2013.01); B25J 9/163 (2013.01);
(Continued)

(58) Field of Classification Search
CPC ........ B25J 9/1664; B25J 9/161; B25J 9/1612; B25J 9/163; B25J 9/1671; B25J 9/1687;
(Continued)

(56) References Cited

U.S. PATENT DOCUMENTS

2021/0122045 A1*   4/2021   Handa .................... B25J 13/084
2021/0187741 A1*   6/2021   Marthi .................. B25J 9/1676
(Continued)

OTHER PUBLICATIONS

Koga, Yotto, Heather Kerrick, and Sachin Chitta. "On cad informed adaptive robotic assembly." 2022 IEEE/RSJ International Conference on Intelligent Robots and Systems (IROS). IEEE, 2022. (Year: 2022).*

(Continued)

*Primary Examiner* — Adam R Mott
*Assistant Examiner* — Matthew C Gammon
(74) *Attorney, Agent, or Firm* — Artegis Law Group, LLP

(57)          ABSTRACT

Techniques are disclosed for controlling robotic systems to perform assembly tasks. In some embodiments, a robot control application receives sensor data associated with one or more parts. The robot control application applies a grasp perception model to predict one or more grasp proposals indicating regions of the one or more parts that a robotic system can grasp. The robot control application causes the robotic system to grasp one of the parts based on a corresponding grasp proposal. If the pose of the grasped part needs to be changed in order to assemble the part with one or more other parts, the robot control application determines movements of the robotic system required to re-grasp the part in a different pose. In addition, the robot control application determines movements of the robot system for assembling the part with the one or more other parts based on results of a motion planning technique.

16 Claims, 12 Drawing Sheets

(52) U.S. Cl.
CPC ........... B25J 9/1671 (2013.01); B25J 9/1687 (2013.01); B25J 19/023 (2013.01)

(58) Field of Classification Search
CPC ................. B25J 19/023; B25J 9/0084; G05B 2219/39533; G05B 2219/40629
See application file for complete search history.

(56) References Cited

U.S. PATENT DOCUMENTS

2022/0084241 A1*  3/2022  Dikhale ................. B25J 9/1694
2023/0125022 A1*  4/2023  Li ........................... B25J 9/023
700/245

OTHER PUBLICATIONS

Gschwandtner, Michael, et al. "BlenSor: Blender sensor simulation toolbox." International Symposium on Visual Computing. Berlin, Heidelberg: Springer Berlin Heidelberg, 2011. (Year: 2011).*

Michniewicz, Joachim, Gunther Reinhart, and Stefan Boschert. "CAD-based automated assembly planning for variable products in modular production systems." Procedia CIRP 44 (2016): 44-49. (Year: 2016).*

B. Zhao, H. Zhang, X. Lan, H. Wang, Z. Tian and N. Zheng, "REGNet: REgion-based Grasp Network for End-to-end Grasp Detection in Point Clouds," 2021 IEEE International Conference on Robotics and Automation (ICRA), Xi'an, China, 2021, pp. 13474-13480 (Year: 2021).*

W. Wan and K. Harada, "Developing and Comparing Single-Arm and Dual-Arm Regrasp," in IEEE Robotics and Automation Letters, vol. 1, No. 1, pp. 243-250, Jan. 2016 (Year: 2016).*

A Pose Proposal and Refinement Network for Better 6D Object Pose Estimation. 2021 IEEE Winter Conference on Applications of Computer Vision (WACV). IEEE, 2021 (Year: 2021).*

Alami et al., "A Geometrical Approach to Planning Manipulation Tasks: The Case of Discrete Placements and Grasps", Jan. 20, 1989, 21 pages.

Ambler et al., "Inferring the Positions of Bodies from Specified Spatial Relationships", In Artificial Intelligence, vol. 6, 1975, pp. 157-174.

Aoki et al., "PointNetLK: Robust & Efficient Point Cloud Registration using PointNet", In 2019 IEEE/CVF Conference on Computer Vision and Pattern Recognition (CVPR), DOI: 10.1109/CVPR.2019.00733, 2019, pp. 7163-7172.

Homem De Mello et al., "A Correct and Complete Algorithm for the Generation of Mechanical Assembly Sequences", In IEEE Transactions on Robotics and Automation, vol. 7, No. 2, Apr. 1991, pp. 228-240.

Drigalski et al., "Team O2AS at the World Robot Summit 2018: An Approach to Robotic Kitting and Assembly Tasks Using General Purpose Grippers and Tools", In Advanced Robotics, DOI: 10.1080/01691864.2020.1734481, 2020, pp. 1-17.

Gorjup et al., "Combining Compliance Control, CAD Based Localization, and a Multi-Modal Gripper for Rapid and Robust Programming of Assembly Tasks", In 2020 IEEE/RSJ International Conference on Intelligent Robots and Systems (IROS), Oct. 25-29, 2020, pp. 9064-9071.

Halperin et al., "A General Framework for Assembly Planning: The Motion Space Approach", In Algorithmica, vol. 26, 2000, pp. 577-601.

He et al., "PVN3D: A Deep Point-wise 3D Keypoints Voting Network for 6DoF Pose Estimation", In 2020 IEEE/CVF Conference on Computer Vision and Pattern Recognition (CVPR), DOI: 10.1109/CVPR42600.2020.01165, 2020, pp. 11629-11638.

Jegou et al., "The One Hundred Layers Tiramisu: Fully Convolutional DenseNets for Semantic Segmentation", In 2017 IEEE Conference on Computer Vision and Pattern Recognition Workshops, DOI: 10.1109/CVPRW.2017.156, 2017, pp. 1175-1183.

Knepper et al., "IkeaBot: An Autonomous Multi-Robot Coordinated Furniture Assembly System", In 2013 IEEE International Conference on Robotics and Automation (ICRA), May 6-10, 2013, pp. 855-862.

Koga et al., "On Multi-Arm Manipulation Planning", In International Conference on Robotics and Automation (ICRA), 1994, pp. 945-952.

Mahler et al., "Dex-Net 2.0: Deep Learning to Plan Robust Grasps with Synthetic Point Clouds and Analytic Grasp Metrics", arXiv:1703.09312, Aug. 8, 2017, 12 pages.

Michniewicza et al., "CAD-based Automated Assembly Planning for Variable Products in Modular Production Systems", In 6th CIRP Conference on Assembly Technologies and Systems (CATS), DOI: 10.1016/j.procir.2016.02.016, 2016, pp. 44-49.

Morrison et al., "Closing the Loop for Robotic Grasping: A Real-time, Generative Grasp Synthesis Approach", In Proceedings of Robotics: Science and Systems (RSS), arXiv:1804.05172, Apr. 14, 2018, 10 pages.

Redmon et al., "Real-Time Grasp Detection Using Convolutional Neural Networks", In 2015 IEEE International Conference on Robotics and Automation (ICRA), May 26-30, 2015, pp. 1316-1322.

Chitta et al., "Movelt!", In IEEE Robotics & Automation Magazine, Mar. 2012, pp. 18-19.

Thomas et al., "Inferring Feasible Assemblies from Spatial Constraints", In IEEE Transactions on Robotics and Automation, vol. 8, No. 2, Apr. 1992, pp. 228-239.

Wan et al., "A Regrasp Planning Component for Object Reorientation", In Autonomous Robot, DOI: 10.1007/s10514-018-9781-y, Jul. 24, 2018, 15 pages.

Yang et al., "Go-ICP: Solving 3D Registration Efficiently and Globally Optimally", In 2013 IEEE International Conference on Computer Vision, DOI: 10.1109/ICCV.2013.184, 2013, pp. 1457-1464.

Zhang et al., "Interlocking Block Assembly With Robots", In IEEE Transactions on Automation Science and Engineering, DOI: 10.1109/TASE.2021.3069742, 2021, 15 pages.

Zhao et al., "REGNet: REgion-based Grasp Network for End-to-end Grasp Detection in Point Clouds", In 2021 IEEE International Conference on Robotics and Automation (ICRA 2021), May 31-Jun. 4, 2021, pp. 13474-13480.

* cited by examiner

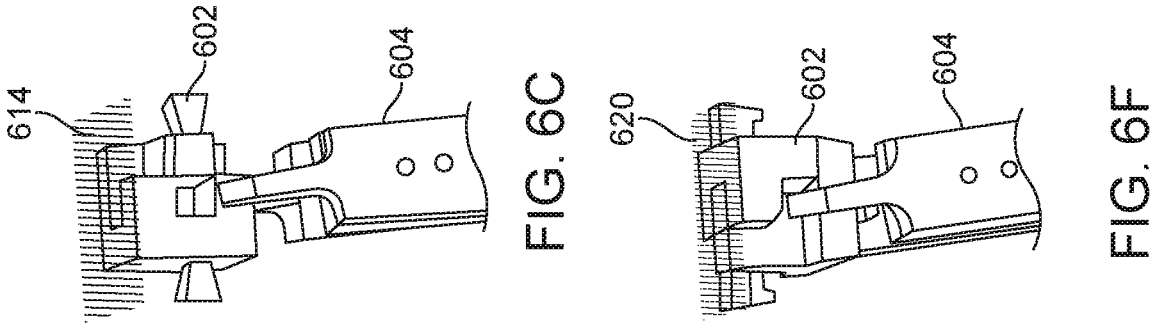
FIG. 6A
FIG. 6B
FIG. 6C
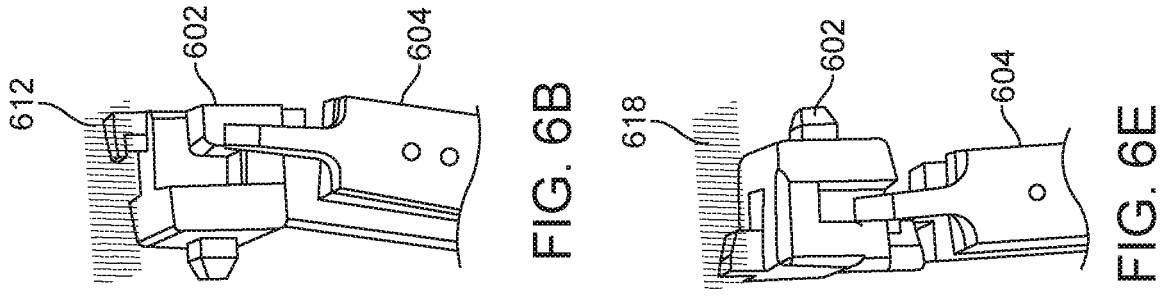
FIG. 6D
FIG. 6E
FIG. 6F

1000

Generate height map images of CAD models representing parts and corresponding height map labels that include grasp proposal and classification labels — 1002

Train grasp perception model based on the height map images and the corresponding height map labels — 1004

1100

Generate height map images of CAD model representing part being viewed from different directions and corresponding height map labels of pose proposals for the different directions — 1102

Train pose estimation perception model based on the height map images and the corresponding result pose proposals indicated by the height map labels — 1104

TECHNIQUES FOR ADAPTIVE ROBOTIC ASSEMBLY

CROSS-REFERENCE TO RELATED APPLICATIONS

This application claims priority benefit of the United States Provisional Patent Application titled, "TECHNIQUES FOR ROBOTIC ASSEMBLY THAT IS INFORMED BY COMPUTER-AIDED DESIGN," filed on Mar. 1, 2022, and having Ser. No. 63/315,451. The subject matter of this related application is hereby incorporated herein by reference.

BACKGROUND

Field of the Disclosure

Embodiments of the present disclosure relate generally to computer science and robotics and, more specifically, to techniques for adaptive robotic assembly.

Description of the Related Art

Robotic systems have become widely used to assemble products in manufacturing environments. One approach for implementing a robotic assembly process is to program a robotic system to perform the same actions repeatedly, which is also sometimes referred to as "fixed automation." For example, a robotic system could be programmed to pick up a part at a specific location, move the part to another location, and assemble the part with other parts to manufacture a product. Once programmed, the robotic system repeats these same actions to manufacture multiple copies of the product.

One drawback of fixed automation is that, as a general matter, fixed automation is not suitable for dynamic manufacturing environments that change over time. For example, a robotic system that is programmed to pick up a part at a specific location is typically unable to pick up that part as the part moves along a conveyor belt, or from a pile of parts scattered on the floor. Another drawback of fixed automation is that fixed automation is not readily adaptable to modifications in the assembly process. For example, when an assembly process is modified to assemble different parts or to assemble parts in a different order, a robotic system that relies on fixed automation must be reprogrammed to perform the modified assembly process. The reprogramming oftentimes requires considerable engineering expertise and is very time consuming.

As the foregoing illustrates, what is needed in the art are more effective techniques for controlling robots when performing assembly tasks.

SUMMARY

One embodiment of the present disclosure sets forth a computer-implemented method for controlling a robotic system. The method includes receiving sensor data associated with one or more parts. The method also includes executing, based on the sensor data, a machine learning model that predicts one or more grasp proposals associated with the one or more parts, where each grasp proposal indicates a region of one of the one or more parts that the robotic system can grasp. The method further includes causing the robotic system to grasp a first part included in the one or more parts based on the one or more grasp proposals. In addition, the method includes determining one or more movements of the robotic system to assemble the first part with one or more other parts, and causing the robotic system to perform the one or more movements.

Other embodiments of the present disclosure include, without limitation, one or more computer-readable media including instructions for performing one or more aspects of the disclosed techniques as well as a computing device for performing one or more aspects of the disclosed techniques.

One technical advantage of the disclosed techniques relative to the prior art is that, with the disclosed techniques, a robotic system can be controlled to perform an assembly task in a dynamic environment that changes over time. In addition, relative to the prior art, the disclosed techniques permit a robotic system to be more easily configured to perform a new or modified assembly process. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6F illustrate exemplar pose proposals, according to various embodiments.

DETAILED DESCRIPTION

In the following description, numerous specific details are set forth to provide a more thorough understanding of the present disclosure. However, it will be apparent to one of skill in the art that the present disclosure may be practiced without one or more of these specific details.

System Overview

Figure 1:
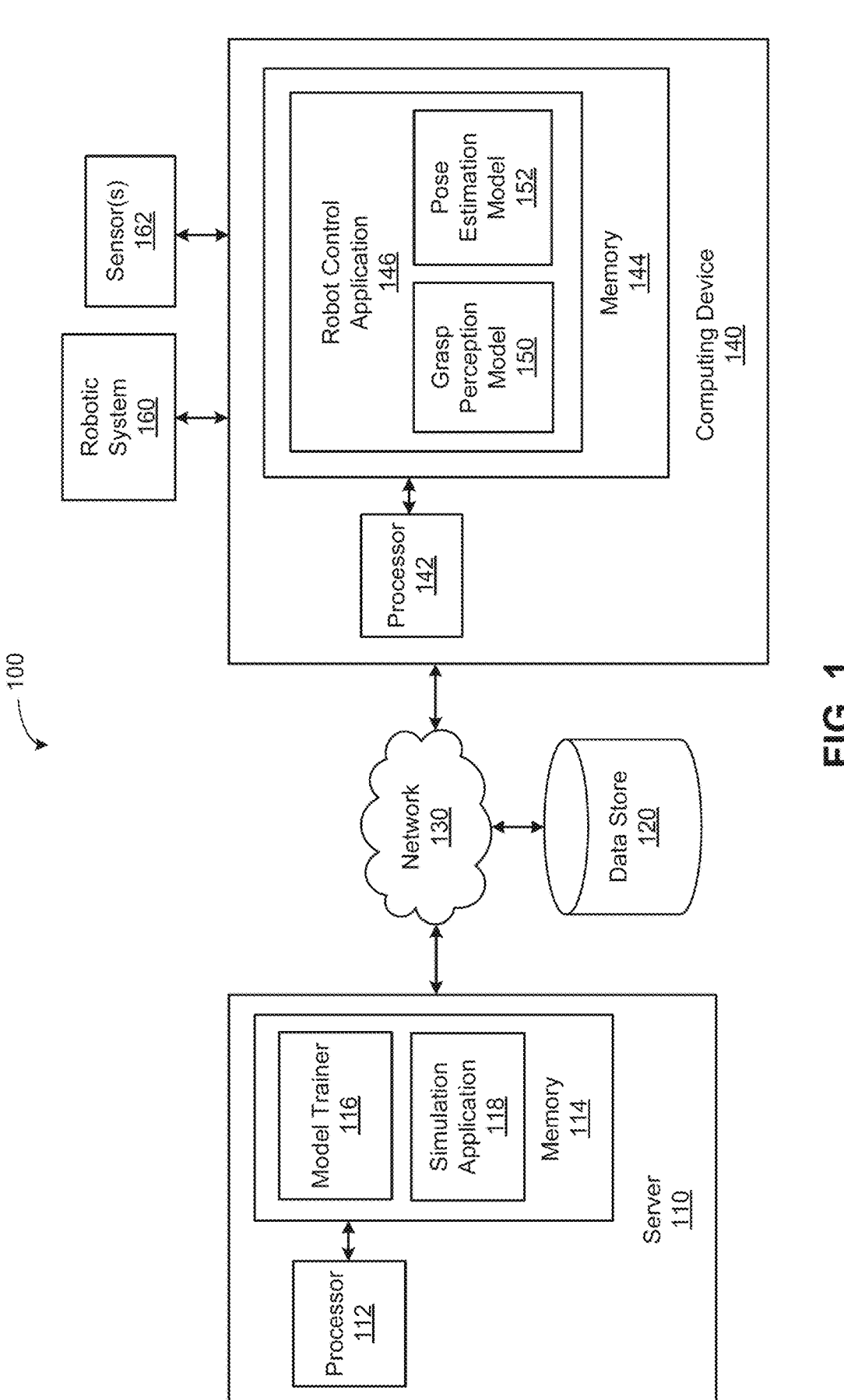
FIG. 1 is a conceptual illustration of a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a model trainer 116 and a simulation application 118 execute on a processor 112 of the machine learning server 110 and are stored in a system memory 114 of the machine learning server 110. The processor 112 receives user input from input devices, such as a keyboard or a mouse. In operation, the processor 112 is the master processor of the machine learning server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The system memory 114 of the machine learning server 110 stores content, such as software applications and data, for use by the processor 112 and the GPU. The system memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 may be modified as desired. Further, the connection topology between the various units in FIG. 1 may be modified as desired. In some embodiments, any combination of the processor 112, the system memory 114, and a GPU may be replaced with any type of virtual computing system, distributed computing system, or cloud computing environment, such as a public, a private, or a hybrid cloud.

The model trainer 116 is configured to train machine learning models. In some embodiments, the model trainer 116 trains (1) a grasp perception machine learning model 150 ("grasp perception model 150") that predicts grasp proposals given a height map associated with one or more parts, and (2) a pose estimation machine learning model 152 ("pose estimation model 152") that predicts a pose proposal given a height map associated with a part being grasped by a robot. Example architectures of the grasp perception model 150 and the pose estimation model 152, as well as techniques for training and utilizing the same, are discussed in greater detail below in conjunction with FIGS. 3-7 and 10-11.

Training data and/or trained machine learning models can be stored in the data store 120. In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120.

Once trained, the grasp perception model 150 and the pose estimation model 152 can be deployed to any suitable applications that control one or more physical robots to perform assembly tasks. Illustratively, a robot control application 146 that utilizes the grasp perception model 150 and the pose estimation model 152 is stored in a memory 144, and executes on a processor 142, of the computing device 140 to control a robotic system 160. Components of the computing device 140, including the memory 144 and the processor 142 may be similar to corresponding components of the machine learning server 110, described above. The robotic system 160 can include any technically feasible robot or robots, operating in any suitable environment (e.g., a manufacturing environment), for which the grasp perception model 150 and the pose estimation model 152 were trained. One or more sensors 162, such as depth camera(s), acquire sensor data in the environment that is used to control the robotic system 160.

Prior to deployment, simulations can be performed to ensure that the robotic system 160 is able to perform a given assembly task using the grasp perception model 150 and the pose estimation model 152. The simulation application 118 performs such simulations in some embodiments.

The number of machine learning servers and computing devices may be modified as desired. Further, the functionality included in any of the applications may be divided across any number of applications or other software that are stored and execute via any number of devices that are located in any number of physical locations.

Figure 2A:
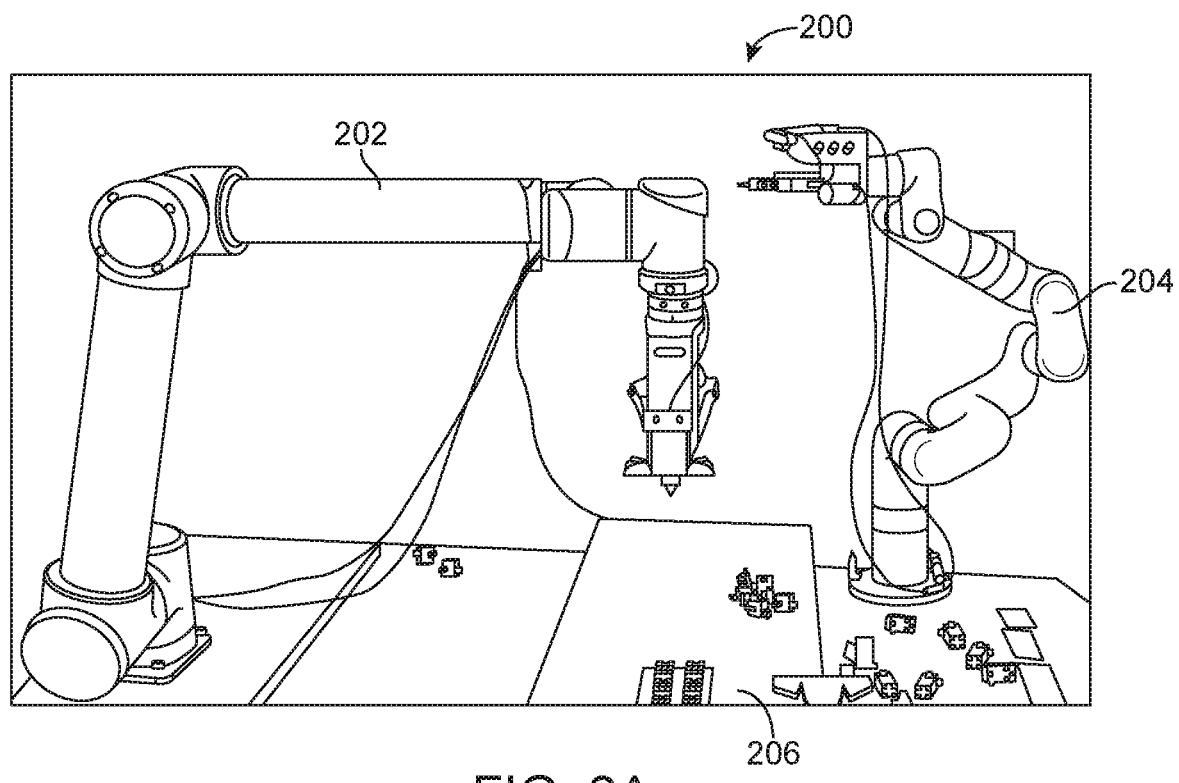
FIG. 2A illustrates an exemplar workcell that includes a robotic system, according to various embodiments.

FIG. 2A illustrates an exemplar workcell that includes a robotic system, according to various embodiments. As shown, a robotic system includes two robots 202 and 204 positioned within a workcell 200 where parts can be assembled. Although two robots 202 and 204 are shown for illustrative purposes, a robotic system can include any number of robots in some embodiments. Illustratively, each of the robots 202 and 204 includes fingers for grasping and assembling parts. Each of the robots 202 and 204 can also include sensor(s) (e.g., sensor(s) 162) that acquire sensor data used in the assembly process. Additionally or alternatively, sensor(s) can be mounted elsewhere in the workcell 200. Illustratively, the workcell 200 also includes an area 206 where parts can be placed, picked up by the robot 202 and/or the robot 204, and assembled together.

Figure 2B:
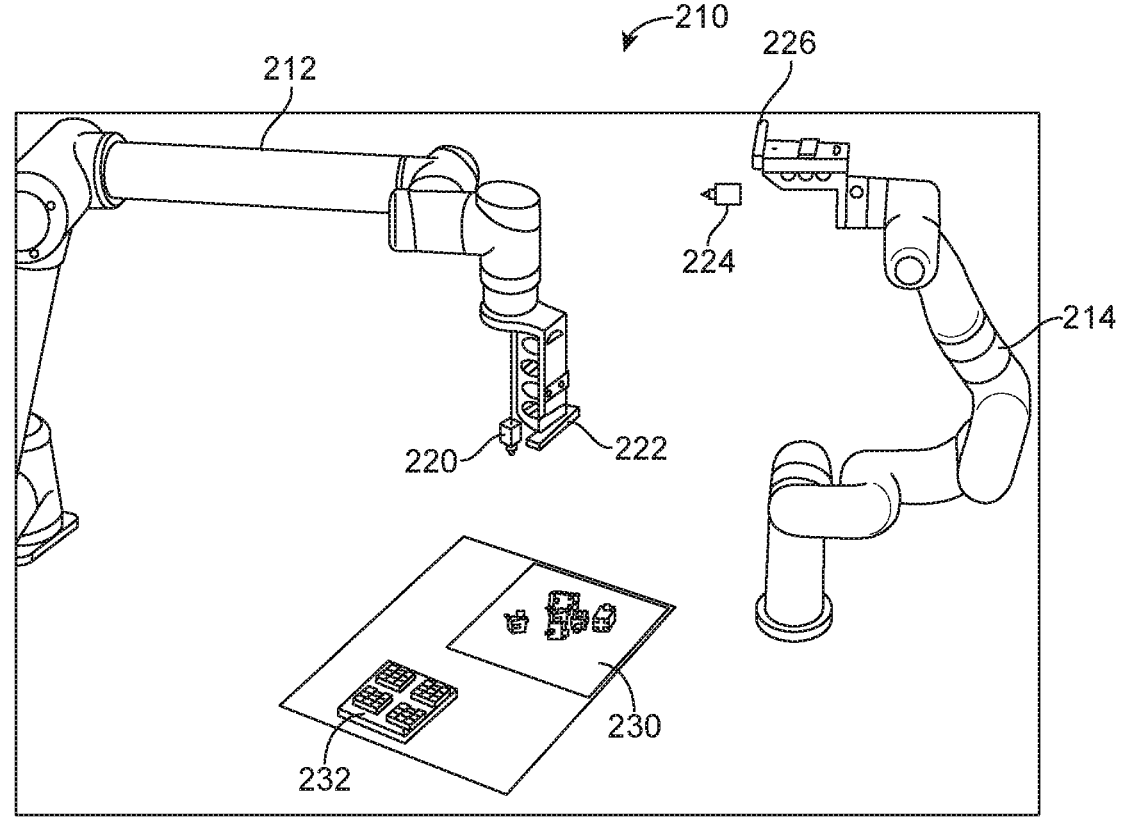
FIG. 2B illustrates a digital twin of the exemplar workcell of FIG. 2A, according to various embodiments.

FIG. 2B illustrates a digital twin of the exemplar workcell of FIG. 2A, according to various embodiments. As shown, a digital twin 210 of the workcell 200 includes models 212 and 214 that represent the robots 202 and 204, respectively. In some embodiments, a graphical user interface (GUI) can be provided (e.g., by the model trainer 116 and/or the simulation application 118) that permits a user to specify fingers 220 and 224 of the robot models 212 and 214, respectively, that can grasp parts; sensors (e.g., cameras) 222 and 226 that acquire sensor data; a pickup area 230 where parts can be picked up; and an assembly area 232 where parts can be assembled; an area where re-grasping occurs;

robot fingers and sensors used during re-grasping, and the like. In such cases, the specified fingers 220 and 224, pickup area 230, and assembly area 232 are used to perform simulations to (1) generate training data for training the grasp perception model 150 and the pose estimation model 152, and (2) validate that grasps of parts and movements of the robots and 202 and 204 are feasible, among other things, as discussed in greater detail below in conjunction with FIGS. 3-12.

Adaptive Robotic Assembly

Figure 3:
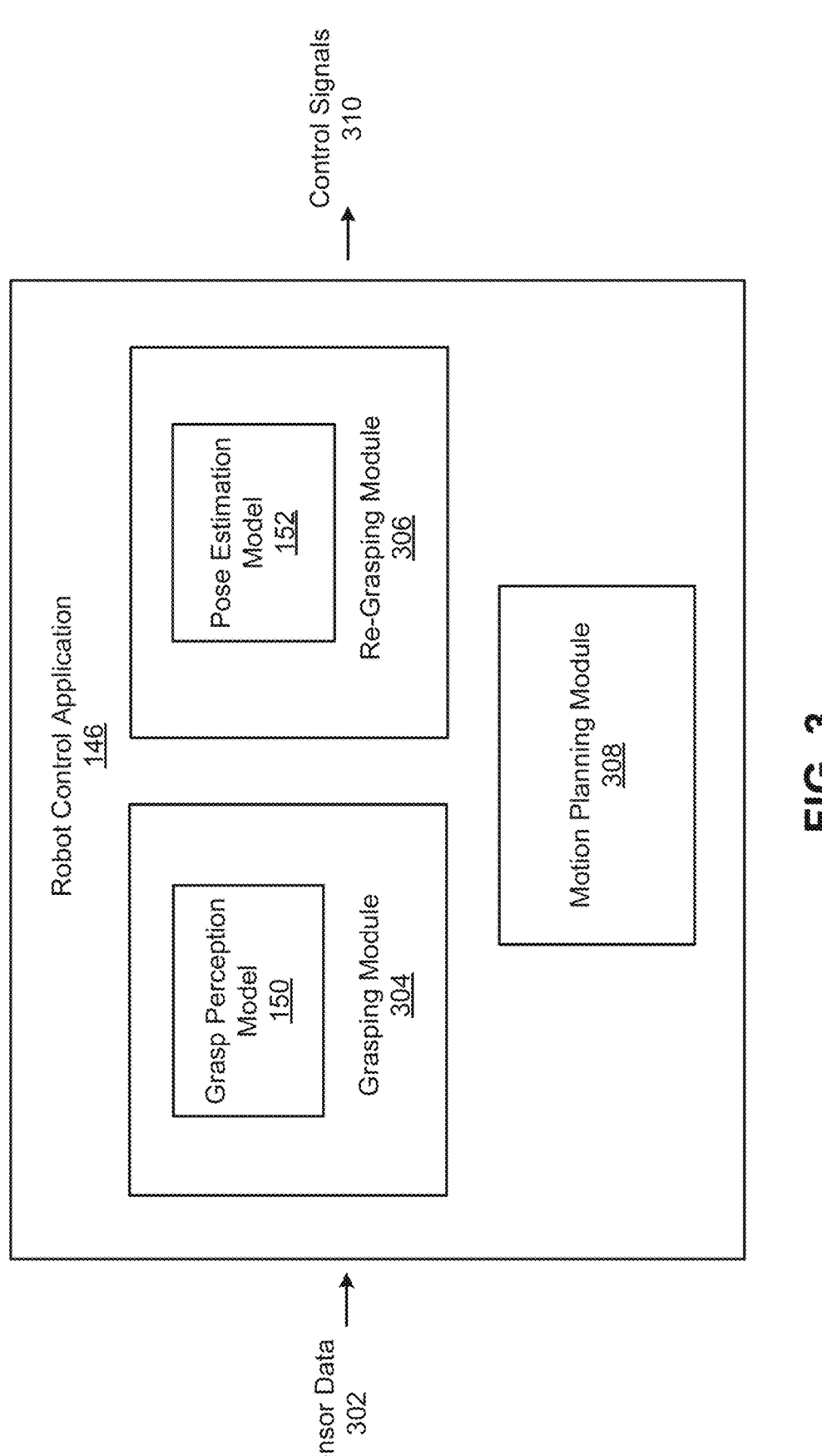
FIG. 3 is a more detailed illustration of the robot control application of FIG. 1, according to various embodiments.

FIG. 3 is a more detailed illustration of the robot control application 146 of FIG. 1, according to various embodiments. As shown, the robot control application 146 includes a grasping module 304, a re-grasping module 306, and a motion planning module 308. In operation, the robot control application 146 takes as input sensor data 302 acquired by one or more sensors (e.g., sensor(s) 162), and the robot control application 146 generates control signals 310 for controlling a robotic system (e.g., robotic system 160). In some embodiments, the robotic system includes at least two robots in a workcell that can pass a part between each other for re-grasping purposes, discussed in greater detail below. In some other embodiments, the robotic system includes one robot, and a fixture or table top can be used for regrasping a part. At each stage of the assembly process, parts need to move from the pickup area to the assembly area and added to an assembly, which can be formulated as a manipulation planning problem that aims to find robot motions to grasp each part and transfer the part to a goal location in a collision-free manner. In some cases, transferring the part to the goal location can require re-grasping of the part using, e.g., stable placement areas or extra fingers to hold the part. To solve such a manipulation planning problem, the robot control application 146 performs three robotic manipulation tasks in some embodiments: picking up parts, re-grasping parts to obtain the required goal grasps for assembling the parts with other part(s), and assembling the parts with the other part(s) at goal locations. Techniques for performing such robotic manipulation tasks are discussed herein with respect to FIGS. 3-12.

To pick up a part, the grasping module 304 determines how fingers of a robot can grasp the part in a collision-free manner. Any technically feasible robot fingers, such as the fingers of a parallel-jaw gripper, can be used in some embodiments. When adding a part to an assembly, the grasping module 304 applies the grasp perception model 150 to determine grasp proposals indicating stable and collision-free regions of parts that fingers of the robotic system can grasp. In some embodiments, the grasp perception model 150 is a semantic segmentation neural network, such as a fully convolutional DenseNet model. Based on the grasp proposals, the grasping module 304 controls the robotic system via control signals 310 to grasp one of the parts. In some embodiments, the grasping module 304 selects a part that is closest in height to the robotic system and controls the robotic system to grasp the part based on a corresponding grasp proposal. In such cases, the grasp proposal can be mapped to the workcell frame and robot fingers opened to a value given by the grasp proposal (plus some extra padding), and the robot fingers can then be moved into position to grasp and pick up the part. In addition, given the corresponding grasp proposal, the grasping module 304 can determine where fingers of the robotic system should grasp the part by performing a principal component analysis (PCA) of the corresponding grasp proposal and orienting the fingers based on the PCA. In some embodiments, PCA is used to obtain, for each grasp proposal, a 3D center, 3D orientation, width, and height of the grasp proposal. In such cases, the center and normal vector for the region can be used as the grasp proposal origin and z-axis direction, respectively. Points in the grasp proposal are located at pixel coordinates of the prediction (e.g., a dense prediction) output by the grasp perception model 150. The height value at an output pixel is a height at that point in the output of the grasp perception model 150. In addition, a part class ID can be concatenated to each pixel height value. A frame of the grasp proposal defines the location of the finger frame for grasping. From just the output of the grasp perception model 150, the orientation the fingers should close on the part can be ambiguous. A value gradient over the grasp proposal can give the grasp orientation, and gradient samples can be concatenated to the pixel height and class ID values. For example, the x-axis direction for the grasp proposal can correspond to a finger closing direction and be along the gradient going from a biggest to a smallest value.

FIGS. 4A-4F illustrate how an exemplar grasp proposal can be generated from user specified robot grasps, according to various embodiments. Each of FIGS. 4A-4E shows a different way that the fingers of a robot 402 can grasp a part 404. In some embodiments, the model trainer 116 provides a GUI (e.g., a point-and-click GUI) that permits a user to input a set of robot grasps for each part, such as the grasps shown in FIGS. 4A-4E. Each robot grasp in the set of robot grasps can be either a single position and orientation of fingers of a robot with respect to the part, or a range between two endpoints. Each grasp input by the user can also be flipped by 180 degrees along a z-axis of the fingers, producing another robot grasp for the set of robot grasps. In some other embodiments, the set of robot grasps can be determined automatically in any technically feasible manner.

Given the set of robot grasps, the model trainer 116 validates each robot grasp to ensure that the robot 404 is able to perform that grasp. In some embodiments, validating a robot grasp includes checking whether the fingers of a robot intersect the part or any other objects in the environment during the robot grasp, in which case the robot grasp would not be valid.

Figure 4A:
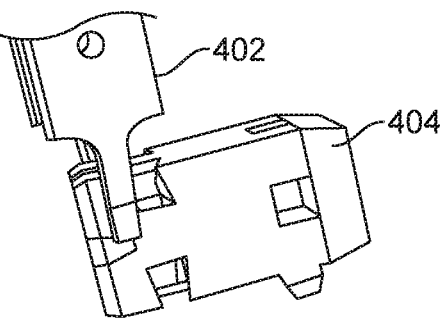
FIGS. 4A-4F illustrate how an exemplar grasp proposal can be generated from user specified robot grasps, according to various embodiments.
Figure 4B:
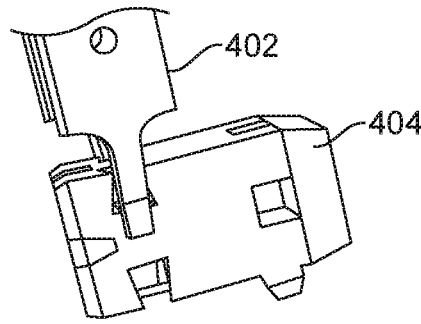
Figure 4C:
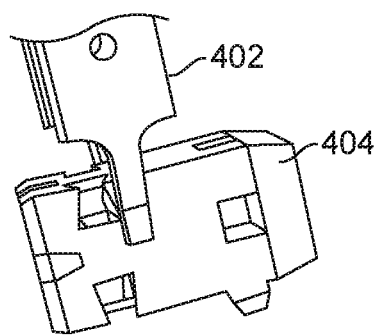
Figure 4D:
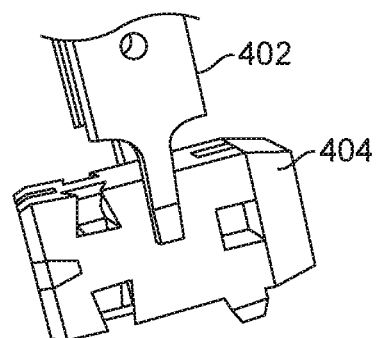
Figure 4E:
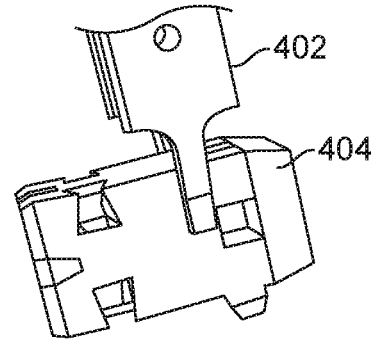
Figure 4F:
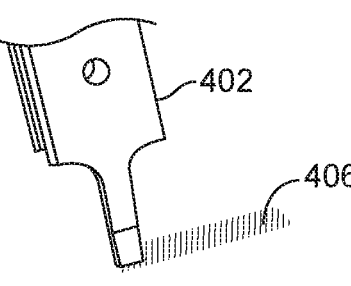

Subsequent to validating the robot grasps, the model training 116 groups consecutive valid robot grasps to generate a grasp proposal for the part. FIG. 4F shows an exemplar grasp proposal 406. As shown, the grasp proposal 406 indicates a region of the part 404 that fingers of the robot 404 can grasp. In particular, the region can be a region where the fingers can grasp the part 404 in a stable and collision-free manner. Given a grasp proposal (e.g., grasp proposal 406) for a part, training data can be generated for training a grasp perception model (e.g., grasp perception model 150) to predict grasp proposals based on sensor data (e.g., sensor data 302) associated with one or more parts.

Figure 5:
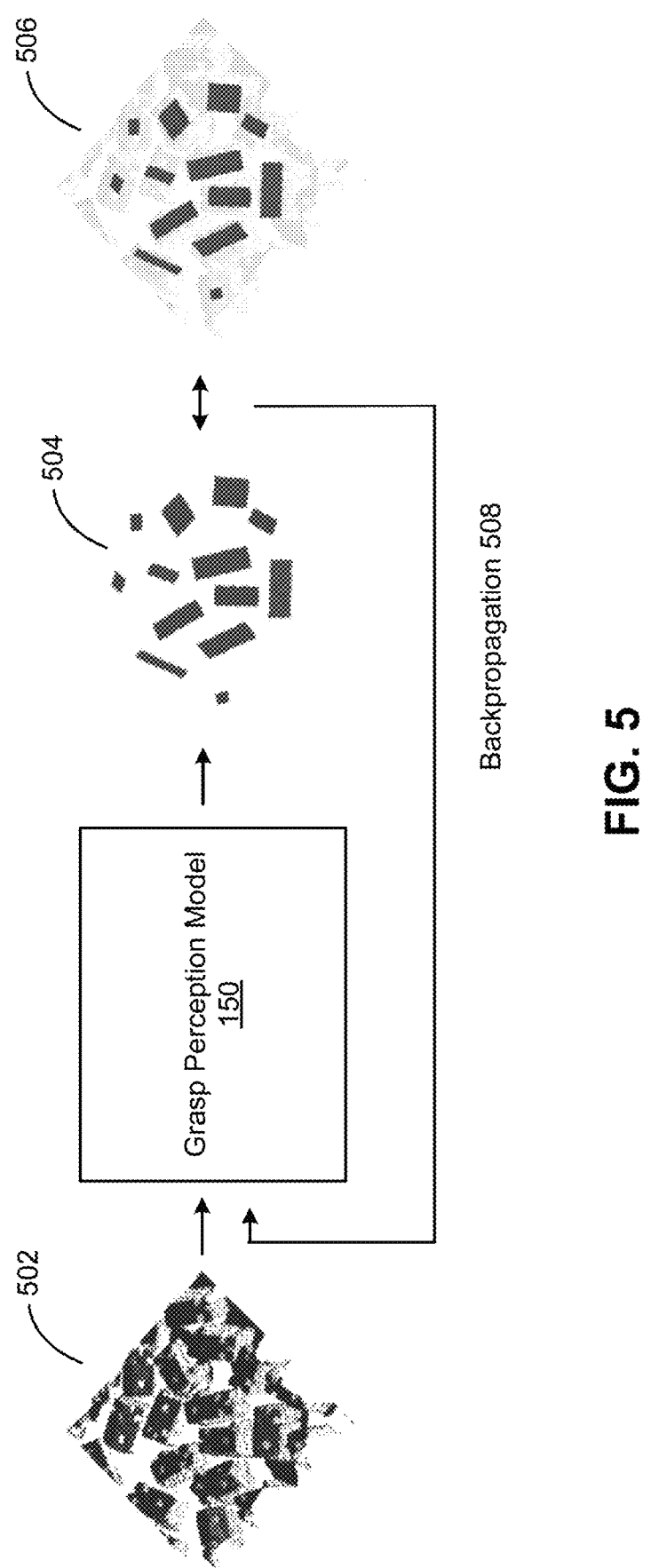
FIG. 5 illustrates how the grasp perception model of FIG. 1 is trained, according to various embodiments.

FIG. 5 illustrates how the grasp perception model 150 of FIG. 1 is trained, according to various embodiments. As shown, the grasp perception model 150 takes as input a height map 502 associated with a number of parts, and the grasp perception model 150 outputs a prediction 504 of grasp proposals associated with the parts. In some embodiments, height maps (e.g., height map 502), which each indicate the height from a plane behind one or more parts, can be generated from depth data indicating distance from a depth sensor, such as depth images captured by a depth camera that is mounted on a robot or elsewhere. In some embodiments, the height maps can be point clouds generated from depth data point clouds. In the example of FIG. 5, the height map 502 is associated with parts that are rectangular in shape, and the prediction 504 includes rectangular grasp proposals indicating stable and collision-free regions of the parts that a robot can grasp.

As shown, the grasp perception model 150 is trained via backpropagation 508. In some embodiments, the model trainer 116 generates training data by (1) simulating CAD models that represent parts at various positions and in various orientations, such as random piles of parts in the pickup area; and (2) rendering, using one or more virtual sensors, depth images of the simulated CAD models. In such cases, the depth images are converted into height maps that are input into the grasp perception model 150 during training. Simulating the CAD models at various positions and in various orientations permits data to be generated for training the grasp perception model 150 to find robot grasps that orient in three dimensions and account for tilt in the parts, thereby maximizing the chance for successful grasps. In some embodiments, training of the grasp perception model 150 attempts to minimize a pixel-wise loss function between the prediction (e.g., prediction 504) that is output by the grasp perception model 150 for a height map (e.g., height map 502) and a ground truth height map label, shown as ground truth height map label 506. For example, in some embodiments, the pixel-wise loss function can be a sum of the cross-entropy loss of the height, class, and gradient value in the prediction. In such cases, the loss can also be scaled by the number of points with non-zero height values in the labeled data to account for the sparseness of grasp proposals.

In the ground truth height map label used to train the grasp perception model 150, grasp proposals are labeled based on the simulated CAD models and the known relationship between each part represented by a CAD model and a corresponding grasp proposal that is generated by grouping valid robot grasps input by a user, described above in conjunction with FIGS. 4A-4F. In some embodiments, the grasp proposal labels are computed in the following manner. For each part in a ground truth height map label, a CAD model of the grasping fingers of a robot is positioned at each grasp in the set of robot grasps described above in conjunction with FIGS. 4A-4F. A grasp is considered valid if the CAD model of the robot fingers grasping the part does not collide with any other parts or the environment. When a grasp defines a range between two endpoints of the fingers along the part, the range can be discretized into a number of steps that are each checked for validity. Consecutive, valid tests for grasps are grouped together to create a grasp proposal. The frame of the grasp proposal is the frame of the finger tips at the midpoint of the span. Since the finger frame can be rotated by 180 degrees around a z-axis and be the same grasp, ambiguity can be avoided in the label by constraining the proposal frame to have an x-axis direction that always points towards the right half of the camera view. The dimension of the grasp proposal in the x-axis is the spacing between the fingers for the grasp, and the dimension in the y-axis is the finger width plus the span of consecutive, valid tests. All valid grasp proposals can be checked for any overlap with other grasp proposals from the camera view. If there is an overlap, the bottom proposal is discarded. The remaining proposals are then rendered into a heightmap that matches the associated part heightmap sample (rendered from the same camera viewpoint). The resulting label can then be saved in any technically feasible format, such as an image format in which the height of the grasp proposal pixels are encoded in the alpha channel of the rendered result, the grasp proposal x-axis direction gradient is encoded in the one color channel, and the part class associated with the proposal pixels are encoded in another color channel.

Returning to FIG. 3, after the grasping module 304 selects a part and controls the robotic system to grasp the selected part based on a corresponding grasp proposal, the part needs to be moved and assembled with one or more other parts. As described, the grasping module 304 can determine where fingers of the robotic system should grasp the part by performing a PCA of the corresponding grasp proposal and orienting the fingers based on the PCA.

The motion planning module 308 is responsible for determining movements of the robotic system required to assemble a part that is being grasped by the robotic system with one or more other parts. In some embodiments, an order in which parts are to be assembled together (also referred to herein as the "assembly order") is specified by a user (e.g., via a GUI) or determined based on a user specification. For example, the assembly order could include covering a base part with another part, screwing the other part and the base part in place, etc. In some embodiments, the workflow used to specify the assembly order is reversed. In such cases, the user first designs an assembly with all parts put together. Then, the user specifies (e.g., via a GUI) how to disassemble the assembly piece by piece. For example, the user could click on screws of the assembly to make the screws disappear, click on a cover plate to make the cover plate disappear, etc. The assembly order can be obtained by reversing the disassembly order specified by the user. In some other embodiments, the assembly order of parts can be generated using appropriate automated planning techniques.

Given the assembly order, the motion planning module 308 applies a motion planning technique to determine, for each part being grasped, movements of the robotic system that are required to assemble the part with one or more other parts according to the assembly order. Any technically feasible motion planning technique can be employed, including well-known motion planning techniques, in some embodiments. In some embodiments, the motion planning technique can be applied with grasp constraints to solve for (1) how the part needs to move, such as through one or more waypoints, in order to reach a target destination where the part is assembled with the one or more other parts, and (2) the grasp that is required to assemble the part with the one or more other parts. In such cases, the grasping constraint criteria for each part can require the robot and fingers to maintain a grasp of the part, and the part, robot, and the fingers must also be collision-free throughout the path. For example, the motion planning technique could be used to determine that part B approaches part A from a top direction, part C approaches from a side direction and slides in and rotates to hold parts A and B together, etc., as well as how fingers of the robotic system need to hold the parts. In some embodiments, the motion planning technique is run on a disassembly order specified by the user to validate the disassembly order and determine whether a collision-free extraction motion can be found that meets the grasp constraint criteria for all parts. In such cases, the motion planning technique can be run multiple times with the entire assembly design in different random starting poses in the assembly area. If multiple grasps exist, the grasp with the x-axis of the fingers aligned with the motion with which the part is assembled with other parts can be used in some embodiments. Such a grasp is stable and can keep the part from twisting between the fingers during contact with the surfaces of the parts during assembly. The grasp associated with the resulting collision-free path is then the goal grasp.

In some embodiments, the motion planning technique is biased to find straight-line motions with a minimum number of direction changes. The ends of the straight-line motion become waypoints for the disassembly of the part, and the reverse order of waypoints becomes the robot assembly instructions to move the parts into an assembly. Note that, in some embodiments, the motion planning technique can be used to only find the part goal grasps and generate waypoints to deliver the parts to the assembly from just above the assembly area. In such cases, simpler straight-line motions of the fingers or sensors can be used for gross robot motion in the workcell.

The re-grasping module 306 is responsible for (1) determining the pose of a grasped part with respect to a robot; (2) determining whether a re-grasping of the part by the robot or another robot is required to assemble the part with one or more other parts, based on the required assembly grasp determined by the motion planning module 308; and (3) if a re-grasping is required, determining movements of the robot and/or another robot to perform the re-grasping. Illustratively, the re-grasping module 306 determines the pose of a grasped part using the pose estimation model 152, which takes as input a height map associated with the grasped part and outputs a pose proposal associated with the part. In some embodiments, the pose estimation model 152 is a semantic segmentation neural network, such as a fully convolutional DenseNet model. Re-grasping is required if the pose proposal indicates that the part cannot be assembled with other part(s) in the pose that the part is currently being grasped by the robot.

FIGS. 6A-6F illustrate exemplar pose proposals, according to various embodiments. Each of FIGS. 6A-6F shows fingers of a robot 604 grasping a part 602 in a different pose with respect to the robot 604 and corresponding pose proposals 610, 612, 614, 616, 618, and 620, respectively. The extent of each of the pose proposals 610, 612, 614, 616, 618, and 620 is the face of a bounding box that is visible from a particular viewing direction, shown as the top-down direction in FIGS. 6A-6F. In addition, the pose proposals 610, 612, 614, 616, 618, and 620 are placed at an extreme point of the part 602 in the viewing direction, shown as the topmost point of the part 602 in FIGS. 6A-6F. In some embodiments, pose proposals for a part can be defined as follows. Partition any view directions of the part into a top, bottom, left, right, front, and back direction. Such directions correspond to the six primary viewing directions of the part along the frame axes of the part. A view direction of the part that is within a 45-degree frustum of a primary direction is said to have that primary view direction. Then, for each primary view direction, there is one associated pose proposal. Although the pose proposals 610, 612, 614, 616, 618, and 620 corresponding to the faces of parts are shown for illustrative purposes, any suitable pose proposals can be used in some embodiments, including pose proposals that do not need to correspond to the faces of parts.

Given a set of pose proposals for a part (e.g., pose proposals 610, 612, 614, 616, 618, and 620), a pose estimation model (e.g., pose estimation model 152) can be trained to predict pose proposals based on sensor data (e.g., sensor data 302) associated with the part. In some embodiments, the pose estimation model outputs the pose proposal for the view direction of an input part heightmap. Each proposal can have a fixed offset from the part frame, and PCA can be used to obtain the center and 3D orientation of the proposal. Applying the offset, a pose estimate of the part can be inferred.

Figure 7:
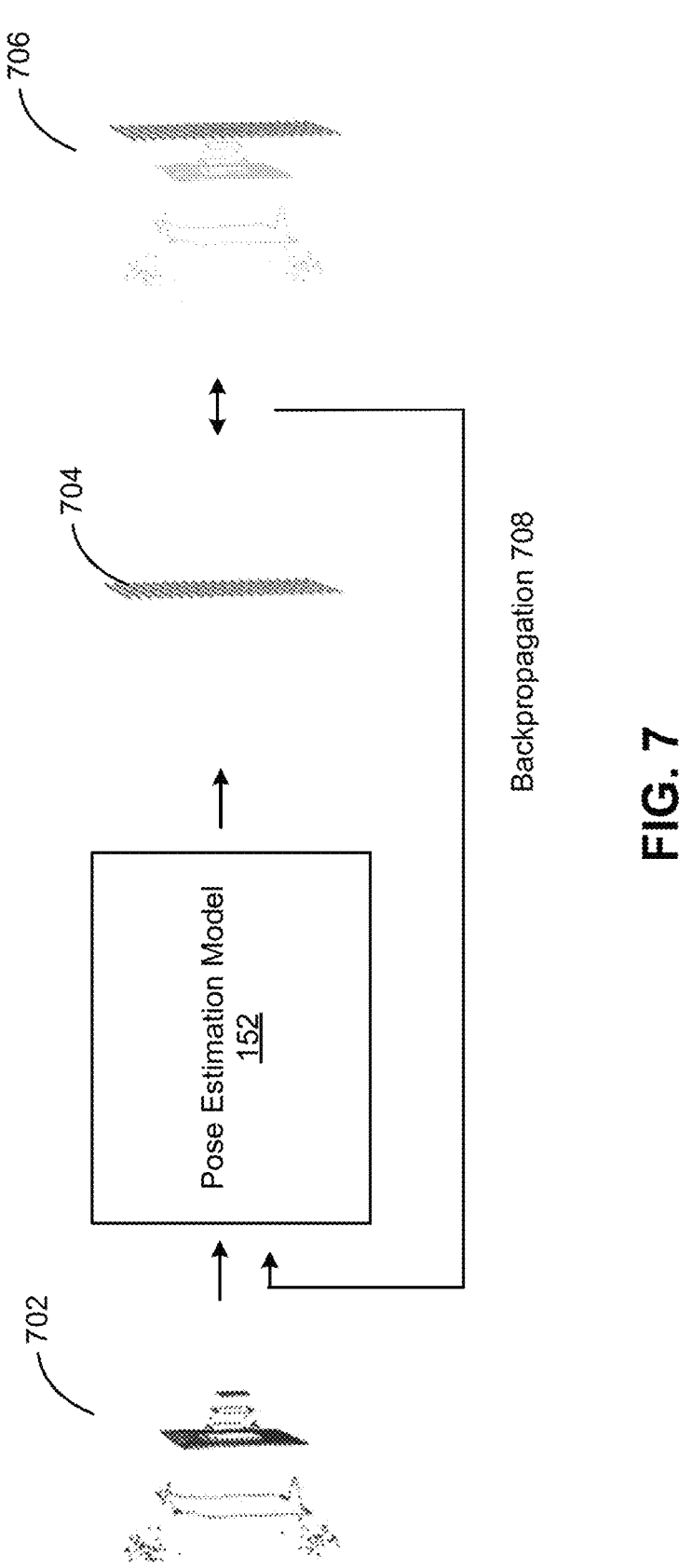
FIG. 7 illustrates how the pose estimation model of FIG. 1 is trained, according to various embodiments.

FIG. 7 illustrates how the pose estimation model 152 of FIG. 1 is trained, according to various embodiments. As shown, the pose estimation model 152 takes as input a height map 702 associated with a part being grasped by a robot, and the pose estimation model 152 outputs a pose proposal 704 associated with the part being grasped. In some embodiments, height maps (e.g., height map 702) can be generated from depth data acquired by a depth sensor, such as depth images captured by a depth camera mounted on a robot or elsewhere.

As shown, the pose estimation model 152 is trained via backpropagation 708. In some embodiments, the model trainer 116 generates training data by simulating a CAD model that represents a part being grasped in various poses by a robot, and rendering, via one or more virtual depth sensors, depth images of the simulated CAD model. Then, the depth images are converted to height maps and input into the pose estimation model 152 during training. More specifically, in some embodiments, the model trainer 116 samples a heightmap of each part randomly positioned in front of a virtual depth sensor, with the distance between the parts and the virtual depth sensor being controlled in a fixed interval that ensures all parts are fully viewable by the virtual depth sensor. In some embodiments, an associated pose proposal label can be computed for each such sample as follows. The model trainer 116 first creates a pose proposal for each primary view direction for each part by taking the bounding box of the part and making each face the pose proposal for the associated view direction. For example, the bounding box face on the top side would be the pose proposal for the top view direction. The frame for each pose proposal is centered on the face, with the x and y axes aligned with the width and height directions and the z-axis along the face normal. The width and height of the face are the width and height of the associated pose proposal. The model trainer 116 records an offset between the part frame and each of the six pose proposal frames and determines the primary view direction for the given heightmap sample of the part. For that view direction, the model trainer 116 takes the associated pose proposal, positions the pose proposal with respect to the part frame, and renders the pose proposal into a heightmap that matches the associated part heightmap sample. The pose proposal can then be stored in any technically feasible format. For example, the height of the pose proposal pixels could be encoded in the alpha channel of the rendered result, the pose proposal x-axis direction gradient could be encoded in one color channel, and the part class and a primary view ID associated with the proposal pixels can be encoded in another channel. The combined ID is: id=viewid+6*partid. It should be noted that some view directions of parts have rotational symmetry order greater than 1. For example, each view direction of a cube shape will have rotational symmetry of 4. Such an ambiguity can be handled by constraining the direction of the x-axis of the pose proposal during data generation. For example, for a view direction with rotational symmetry of order 2, the x-axis direction of the proposal can be constrained to point towards the right half of the virtual sensor view.

In some embodiments, training of the pose estimation model 152 attempts to minimize a pixel-wise loss function between the prediction (e.g., prediction 704 of a pose proposal output by the pose estimation model 152 for a given height map (e.g., height map 702) and a ground truth height map label, shown as ground truth height map label 706. For example, in some embodiments, the pixel-wise loss function can be a sum of the cross-entropy loss of the height, class, and gradient value in the prediction. In such cases, the loss can also be scaled by the number of points with non-zero height values in the labeled data to account for the sparseness of pose proposals. In the ground truth height map label, a pose proposal is labeled based on the simulated CAD model and the known relationship between the part represented by the CAD model and pose proposals corresponding to the part for different viewing directions, described above in conjunction with FIGS. 6A-F.

Returning to FIG. 3, the robot control application 146 takes as input sensor data 302 acquired by one or more sensors (e.g., sensor(s) 162), and the robot control application 146 generates control signals 310 for controlling a robotic system (e.g., robotic system 160). As described, the robot control application 146 needs to perform three robotic manipulation tasks: picking up parts, re-grasping parts to obtain the required goal grasps for assembling the parts with other part(s), and assembling the parts with the other part(s) at goal locations. In some embodiments, to perform the three robotic manipulation tasks, the robot control application 146 applies the grasp perception model 150 to determine grasp proposals indicating stable and collision-free regions of parts that fingers of the robotic system can grasp; causes the robotic system to move to grasp the parts based on the grasp proposals; applies the pose estimation model 152 to determine a pose proposal associated with each part being grasped; determines movements of the robotic system required to assemble each part with one or more other parts based on results of a motion planning technique with grasping constraints; determines a re-grasping of each part that needs to be re-grasped in order to be assembled together with other part(s); and causes the robotic system to perform the determined movements and re-graspings, if any. In some embodiments, the foregoing steps are validated via simulation using a digital twin (e.g., digital twin 210) of a workcell that includes a robotic system before the robot control application 146 is deployed to control a physical robotic system. For example, in some embodiments, the steps can be specified using a "recipe" of tasks in a script that is either programmed by a user or automatically generated. The recipe can include instructions specifying, for each part, a type of the part, a general location in a workcell of the part, which sensor(s) are used to locate the part, fingers that will grasp the part, sensor(s) that will be used to determine a pose estimate when the part is grasped, a goal grasp to assemble the part with one or more other parts, and intermediate waypoints to assembly the part with the one or more other parts. The recipe can be executed using the digital twin to identify issues during the assembly process, such as the robotic system colliding with objects in the environment, and corrections can be made, either by the user or automatically, to the steps that the robot control application 146 performs before the robot control application 146 is deployed to control the physical robotic system. Pseudocode for the script corresponding to an exemplar recipe is shown in Algorithm 1.

---

Algorithm 1

```
sequence = recipe.get_assembly_sequence( )
camera = recipe.assembly_camera
WTB = camera.get_pose(recipe.assembly_area)
while s in sequence do
    s.fingers.pickup_part(recipe.pickup_area, s.camera, s.part_class)
    PTF = s.fingers.re-grasp(s.goal_grasp, s.camera, s.other_fingers,
    s.other_camera)
    while WTF in s.insertion_waypoints(WTB, PTF) do
        s.goal_fingers.move_to(WTF)
```

-continued

---

Algorithm 1

```
    end while
    s.goal_fingers.move_to(WTF)
end while
```
$^W T^B$ - fixed base transform in the workcell frame
$^P T^F$ - finger transform in the part frame
$^W T^F$ - finger transform in the workcell frame

---

Figure 8:
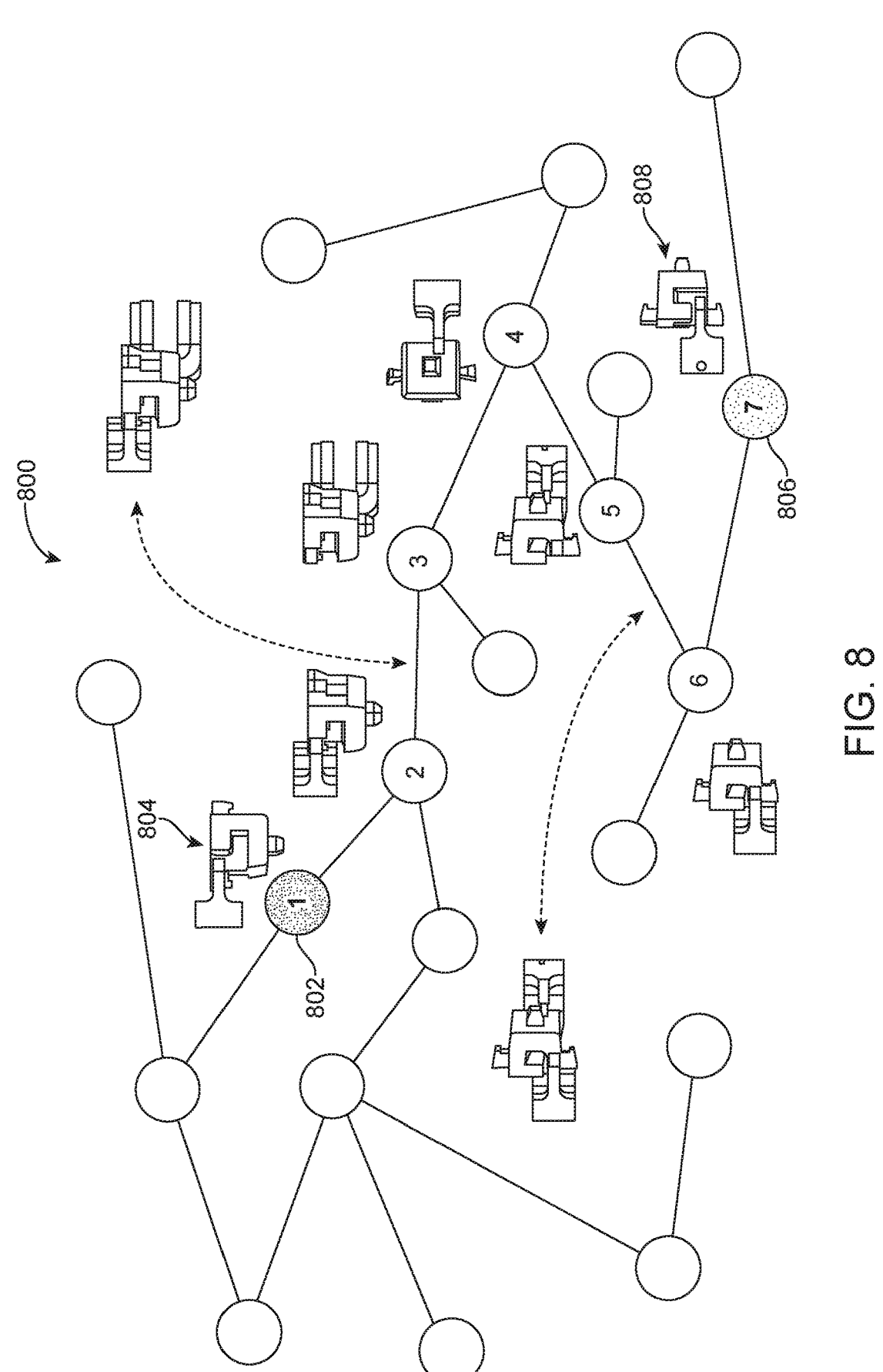
FIG. 8 illustrates an exemplar graph for determining how a part can be re-grasped, according to various embodiments.

FIG. 8 illustrates an exemplar graph 800 for determining how a part can be re-grasped, according to various embodiments. As shown, the graph 800 includes a number of nodes connected by edges. Each node represents one robot of a robotic system (e.g., one of the two robots 202 and 204) grasping a part in a particular pose. Each edge (1) represents a repose in which a robot moves to reorient the part from one pose to another, or (2) a re-grasp in which one robot releases the part in one pose and another robot grasps the part in the same pose. In some embodiments, the graph 800 is automatically generated by sampling different ways the robots of the robotic system are able to grasp the part in different poses. In such cases, an associated grasp pose for a given part pose for each grasp in the set of grasps, described above in conjunction with FIGS. 4A-F, can be computed. Then, the grasp pose can be tested to determine if the grasp pose for the fingers of a robot is achievable. Achievable grasps can further be tested to determine if the robot and fingers are collision-free with the environment during the grasps. If such conditions are met during the tests, the (grasp, partpose, finger) tuple can be added as a node to the graph 800. Two nodes of the graph 800 with the same grasp and fingers are connected if the fingers (and associated robot) can move the part from the pose in the first node to the second node in a collision-free and reachable manner. Such an edge type represents a repose step. Two nodes of the graph 800 can also be connected if the nodes share the same part pose, the fingers in the nodes are different (i.e., the robots in the nodes are different), and the robots, fingers, and any attached peripherals to the robots grasping the part simultaneously do not collide with each other. Such an edge type represents a re-grasp step. In some embodiments, to re-grasp a part, the part is first moved into a shared part pose associated with an edge using robot fingers currently grasping the part. Then, free fingers are moved in a linear motion to a hovering position just above a grasp pose with the fingers opened slightly greater than a grasp definition. Thereafter, the fingers are moved in a linear motion to the grasp pose and closed around the part. The fingers that were previously grasping the part release the part and move in a linear motion just above their last grasp, and then to an area away from the part to give clearance for reorienting the part. Although described herein primarily with respect to two robots being used to re-grasp a part, in some embodiments, a single robot can regrasp a part using, e.g., a fixture or table top. In such cases, only the single robot moves to regrasp and reposition the part in the fixture/table top.

To perform re-grasping, the robot control application 146 determines an (1) an initial pose of a grasped part using the pose estimation model 152, the initial pose corresponding to a first node of the graph 800; and (2) target pose(s) of the part that are required to assemble the part with one or more other parts by trying different ways fingers of the robotic system can grasp the part and identifying which ways permit the part to be assembled with the one or more other parts, each target pose corresponding to a second node of the graph 800. Given the initial pose and a target pose of the grasped part, the robot control application 146 performs a search of the graph 800 to determine a shortest path of nodes representing a re-grasping sequence from the first node representing the initial pose to the second node representing the target pose. Any technically feasible graph searching technique, such as the best-first search technique, can be employed in some embodiments. For example, in some embodiments, the best-first search technique can be used to traverse edges of the graph and find the minimum number of re-grasp steps required to achieve a desired goal grasp of a part if such a path exists. After the shortest path of nodes is determined, the robot control application 146 causes a robotic system to perform re-grasping according to the shortest path of nodes by controlling the robotic system to move from the robot grasp represented by the first node to the robot grasp represented by a next node along the shortest path, etc., until the second node is reached.

Figure 9:
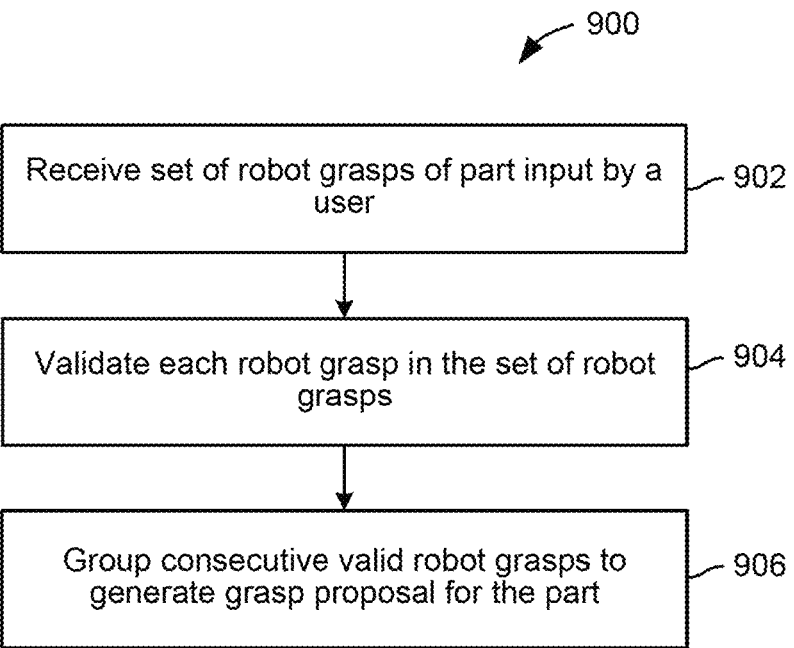
FIG. 9 is a flow diagram of method steps for generating a grasp proposal, according to various embodiments.

FIG. 9 is a flow diagram of method steps for generating a grasp proposal, according to various embodiments. Although the method steps are described in conjunction with the system of FIG. 1, persons of ordinary skill in the art will understand that any system configured to perform the method steps, in any order, is within the scope of the present disclosure.

As shown, a method 900 begins at step 902, where the model trainer 116 receives a set of robot grasps of a part that are input by a user. The robot grasps can be input by the user in any technically feasible manner, such as via a GUI, in some embodiments.

At step 904, the model trainer 116 validates each robot grasp in the set of robot grasps. Validating a robot grasp ensures that a robot can perform the grasp. In some embodiments, validating a robot grasp includes checking whether the fingers of a robot intersect the part or any other objects in the environment during the grasp, in which case the grasp would not be valid.

At step 906, the model training 116 groups consecutive valid robot grasps to generate a grasp proposal for the part. As described, the grasp proposal indicates a stable and collision-free region of the part that a robot can grasp.

Figure 10:
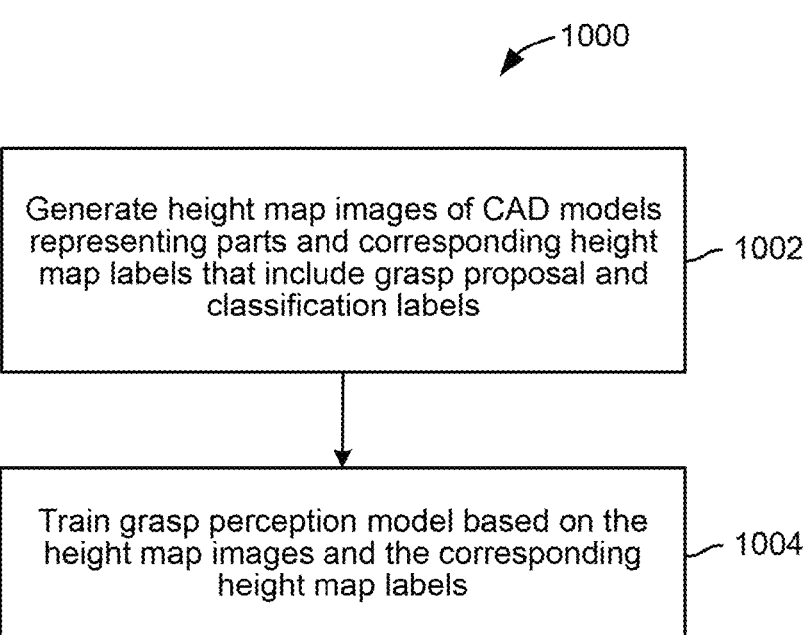
FIG. 10 is a flow diagram of method steps for training a grasp perception machine learning model, according to various embodiments.

FIG. 10 is a flow diagram of method steps for training a grasp perception machine learning model, according to various embodiments. Although the method steps are described in conjunction with the systems of FIG. 1-4, persons of ordinary skill in the art will understand that any system configured to perform the method steps, in any order, is within the scope of the present disclosure.

As shown, a method 1000 begins at step 1002, where the model trainer 116 generates height map images of CAD models representing parts and corresponding height map labels that include labels of grasp proposal and classifications (e.g., class identifiers (IDs)) of the parts. In some embodiments, the model trainer 116 can simulate the CAD models that represent parts at various positions and in various orientations, render depth images of the simulated CAD models using a virtual depth sensor, and convert the depth images into height map images. In addition, the model trainer 116 can generate the corresponding images that include grasp proposal and classification labels based on (1) the known relationship between each part represented by a CAD model and a corresponding grasp proposal, which can be used to generate the grasp proposal labels; and (2) the known type of part represented by each CAD model, which can be used to generate the classification labels.

At step 1004, the model trainer 116 trains the grasp perception model 150 based on the height map images and the corresponding height map labels that include grasp proposal and classification labels. In some embodiments, the training uses the height map images as example inputs to the grasp perception model 150 and the corresponding result that includes grasp proposal and classification labels as example outputs of the grasp perception model 150. In some embodiments, the training employs backpropagation and attempts to minimize a pixel-wise loss function, as described above in conjunction with FIG. 5.

Figure 11:
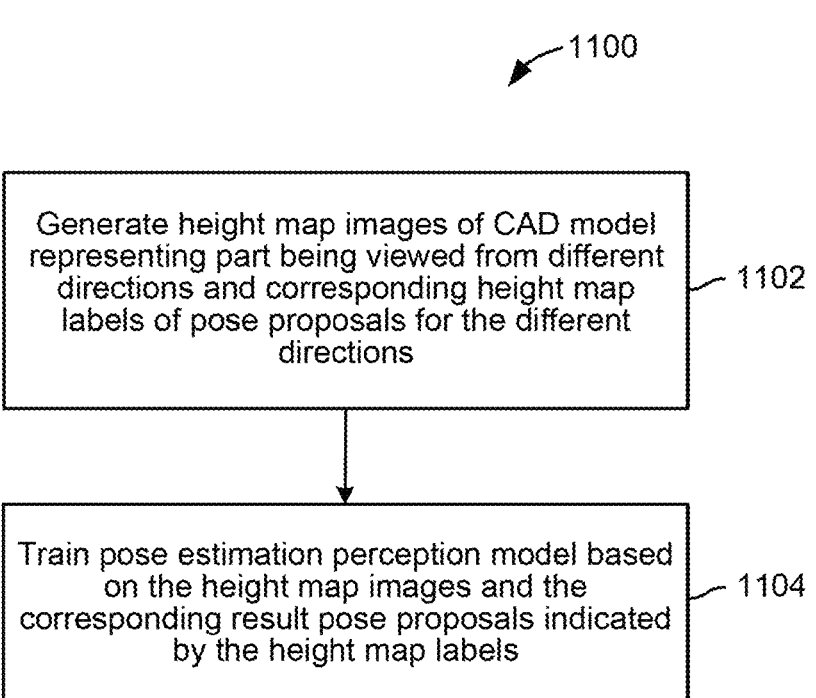
FIG. 11 is a flow diagram of method steps for training a pose estimation machine learning model, according to various embodiments.

FIG. 11 is a flow diagram of method steps for training a pose estimation machine learning model, according to various embodiments. Although the method steps are described in conjunction with the systems of FIGS. 1-3 and 6, persons of ordinary skill in the art will understand that any system configured to perform the method steps, in any order, is within the scope of the present disclosure.

As shown, a method 1100 begins at step 1102, where the model trainer 116 generates height map images of a CAD model representing a part being viewed from different directions and corresponding height map labels of pose proposals for the different directions. In some embodiments, the model trainer 116 generates the corresponding labels of pose proposals based on the known relationship between the part represented by the CAD model and pose proposals corresponding to the part for different viewing directions, described above in conjunction with FIGS. 6A-F.

At step 1104, the model trainer 116 trains the pose estimation model 152 based on the height map images and the corresponding result pose proposals indicated by the height map labels. In some embodiments, the training employs backpropagation and attempts to minimize a pixel-wise loss function, as described above in conjunction with FIG. 7.

Figure 12:
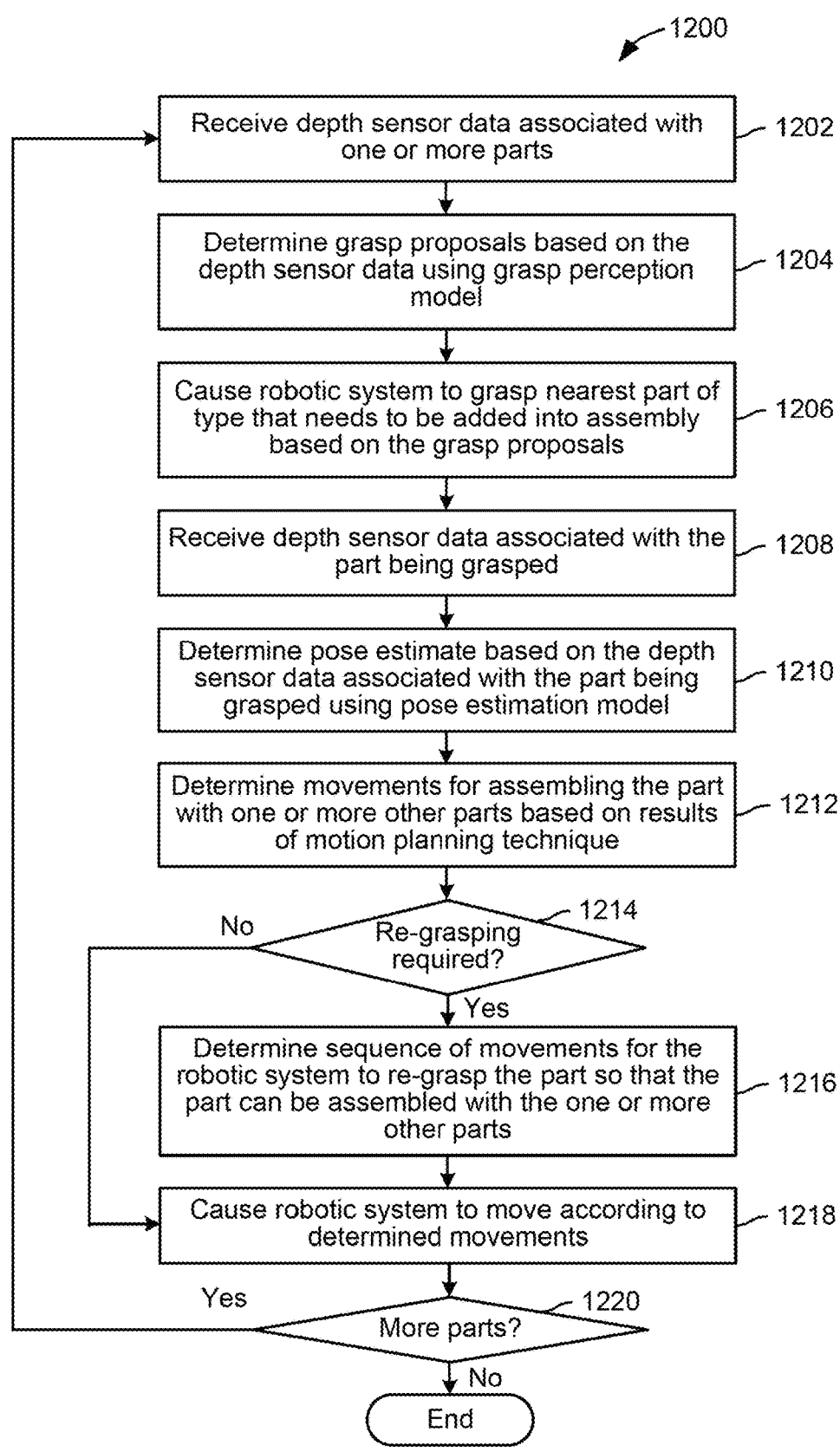
FIG. 12 is a flow diagram of method steps for controlling a robot to perform an assembly task, according to various embodiments.

FIG. 12 is a flow diagram of method steps for controlling a robot to perform an assembly task, according to various embodiments. Although the method steps are described in conjunction with the systems of FIGS. 1-4, persons of ordinary skill in the art will understand that any system configured to perform the method steps, in any order, is within the scope of the present disclosure.

As shown, a method 1200 begins at step 1202, where the robot control application 146 receives depth sensor data associated with one or more parts. The depth sensor data can be acquired via any technically feasible sensor device or devices, such as a depth camera that is mounted on a robot or elsewhere, in some embodiments. In addition, the parts can be positioned and oriented in any feasible manner within a pick-up area of a manufacturing environment. For example, the parts could be in a pile on the floor, spread out along a conveyor belt, etc.

At step 1204, the robot control application 146 determines grasp proposals based on the depth sensor data using the grasp perception model 150. In some embodiments, the robot control application 146 converts the depth sensor data into a height map and inputs the height map into the grasp perception model 150 that generates the grasp proposals, as described above in conjunction with FIG. 5. In some embodiments, the robot control application 146 also applies a two-dimensional (2D) clustering technique to isolate each grasp proposal.

At step 1206, the robot control application 146 causes a robotic system to grasp a nearest part having a type that needs to be added to an assembly based on the grasp proposals determined at step 1204. In some embodiments, the assembly order is specified by a user or determined based on a user specification (e.g., a user specification of a disassembly order). In some other embodiments, the assembly order is generated using appropriate automated planning techniques. The robot control application 146 causes the robotic system to grasp a nearest part that, based on the assembly order, still needs to be added to the assembly. In some embodiments, the nearest part can be a part that is closest in height to the robotic system. In some embodiments, the robot control application 146 determines where fingers of the robotic system should grasp the nearest part by performing a PCA of a corresponding grasp proposal and orienting the fingers based on the PCA, as described above in conjunction with FIG. 3.

At step 1208, the robot control application 146 receives depth sensor data associated with the part being grasped. Similar to step 1202, the depth sensor data can be acquired via any technically feasible sensor device or devices, such as a depth camera that is mounted on a robot or elsewhere.

At step 1210, the robot control application 146 determines a pose estimate based on the depth sensor data associated with the part being grasped using the pose estimation model 152. In some embodiments, the robot control application 146 converts the depth sensor data into a height map and inputs the height map into the pose estimation model 152, as described above in conjunction with FIG. 7. In turn, the pose estimation model 152 outputs a pose proposal that indicates a pose of the part with respect to the robot grasping the part. Then, PCA can be applied to obtain a center and 3D orientation of the pose proposal and applying an offset, a pose estimate of the part can be inferred, as described above in conjunction with FIGS. 6A-F.

At step 1212, the robot control application 146 determines movements of the robotic system required to assemble the part with one or more other parts based on results of a motion planning technique with grasping constraints. Any technically feasible motion planning technique can be used in some embodiments, including well-known motion planning techniques. In some embodiments, the motion planning technique can be used to verify a disassembly sequence specified by a user and a reverse of the disassembly sequence that includes a set of waypoints for the part to reach a goal location in the assembly, as well as a required grasp for assembling the part with the one or more other parts, as described above in conjunction with FIG. 3. In some embodiments, the motion planning technique can be applied with a grasping constraint for each part that requires a robot and fingers to maintain a grasp of the part and the part, robot, and the fingers must also be collision-free throughout the path.

At step 1214, the robot control application 146 determines whether re-grasping is required based on the pose estimate determined at step 1210 and the movement of the robotic system determined at step 1212. Re-grasping is required if, based on the pose estimate indicating the pose with which the robot is grasping the part and the required grasp for assembling the part with the one or more other parts, the part cannot be assembled with the one or more other parts in the assembly order.

If re-grasping is required, then the method 1200 continues to step 1216, where the robot control application 146 determines a sequence of movements for the robotic system to re-grasp the part so that the part can be assembled with the one or more other parts. In some embodiments, the robot control application 146 determines the sequence of movements by performing a search of a graph whose nodes represent one or more robots grasping the part in different poses, as described above in conjunction with FIG. 8.

At step 1218, the robot control application 146 causes the robotic system to move according to the movements determined at step 1212 and the movements determined at step

1216, if any. In some embodiments, the robot control application 146 can transmit one or more control signals to the robotic system or a controller thereof to cause the robotic system to move according to the determined movements, including to move through one or more waypoints to a goal location in the assembly and to move through the sequence of movement for re-grasping, if any.

At step 1220, if there are more parts to add to the assembly, then the method 1200 returns to step 1202, where the robot control application 146 receives additional sensor data associated with one or more parts. On the other hand, if there are no more parts to add, then the method 1200 ends.

In sum, techniques are disclosed for controlling robotic systems to perform assembly tasks. In some embodiments, a robot control application receives sensor data, such as depth data, associated with one or more parts. The robot control application applies a grasp perception machine learning model to predict one or more grasp proposals indicating stable and collision-free regions of the one or more parts that a robotic system can grasp. The robot control application selects one of the parts, such as a nearest part to the robotic system, and causes the robotic system to grasp the selected part based on a corresponding grasp proposal. After the part is grasped by the robotic system, the robot control application determines a pose of the grasped part with respect to the robotic system using a pose estimation machine learning model. If the pose of the grasped part with respect to the robotic system needs to be changed in order to assemble the part with one or more other parts, the robot control application determines movements of the robotic system required to re-grasp the part in a different pose with respect to the robotic system. In addition, the robot control application determines movements of the robot system required to assemble the part with the one or more other parts based on results of a motion planning technique. Thereafter, the robot control application causes the robotic system to perform the determined movements, and the foregoing process is repeated for other parts that need to be added to the assembly.

One technical advantage of the disclosed techniques relative to the prior art is that, with the disclosed techniques, a robotic system can be controlled to perform an assembly task in a dynamic environment that changes over time. In addition, relative to the prior art, the disclosed techniques permit a robotic system to be more easily configured to perform a new or modified assembly process. These technical advantages represent one or more technological advancements over prior art approaches.

1. In some embodiments, a computer-implemented method for controlling a robotic system comprises receiving sensor data associated with one or more parts, executing, based on the sensor data, a first trained machine learning model that predicts one or more grasp proposals associated with the one or more parts, wherein each grasp proposal indicates a region of one of the one or more parts that the robotic system can grasp, causing the robotic system to grasp a first part included in the one or more parts based on the one or more grasp proposals, determining one or more movements of the robotic system to assemble the first part with one or more other parts, and causing the robotic system to perform the one or more movements.

2. The computer-implemented method of clause 1, wherein the robotic system comprises a first robot and a second robot, the first part is grasped by the first robot, and the method further comprises computing one or more additional movements of the robotic system to grasp the first part by the second robot in a first pose with respect to the second robot that differs from a second pose with which the part is grasped by the first robot, and causing the robotic system to perform the one or more additional movements.

3. The computer-implemented method of clauses 1 or 2, wherein computing the one or more additional movements comprises performing a search of a graph, and each node of the graph represents one of the first robot or the second robot grasping the first part in a different pose.

4. The computer-implemented method of any of clauses 1-3, further comprising receiving additional sensor data associated with the first part, and executing, based on the additional sensor data, a second trained machine learning model that predicts a pose proposal associated with the first pose of the first part.

5. The computer-implemented method of any of clauses 1-4, further comprising training the second trained machine learning model based on training data that includes (i) sensor data associated with a computer-aided design (CAD) model that represents the first part being grasped in a plurality of poses, and a (ii) plurality of pose proposals that each represents the first part being grasped in a different pose included in the plurality of poses.

6. The computer-implemented method of any of clauses 1-5, further comprising training the first trained machine learning model based on a training set of sensor data associated with one or more computer-aided design (CAD) models of a plurality of parts and one or more grasp proposals associated with the one or more CAD models.

7. The computer-implemented method of any of clauses 1-6, further comprising generating each grasp proposal included in the one or more grasp proposals associated with the one or more CAD models based on one or more user-specified graspings of a CAD model included in the one or more CAD models.

8. The computer-implemented method of any of clauses 1-7, wherein causing the robotic system to grasp the first part comprises computing a principal component analysis of a first grasp proposal included in the one or more grasp proposals that corresponds to the first part, and determining how fingers of the robotic system can grasp the first part based on the principal component analysis.

9. The computer-implemented method of any of clauses 1-8, wherein the one or more movements of the robotic system are computed based on the results of one or more motion planning operations.

10. The computer-implemented method of any of clauses 1-9, wherein the sensor data comprises at least one of height data or depth data.

11. In some embodiments, one or more non-transitory computer-readable media include instructions that, when executed by at least one processor, cause the at least one processor to perform steps for controlling a robotic system, the steps comprising receiving sensor data associated with one or more parts, executing, based on the sensor data, a first machine learning model that predicts one or more grasp proposals associated with the one or more parts, wherein each grasp proposal indicates a region of one of the one or more parts that the robotic system can grasp, causing the robotic system to grasp a first part included in the one or more parts based on the one or more grasp proposals, determining one or more movements of the robotic system to assemble the first part with one or more other parts, and causing the robotic system to perform the one or more movements.

12. The one or more non-transitory computer-readable storage media of clause 11, wherein the robotic system comprises a first robot and a second robot, the first part is grasped by the first robot, and the instructions, when executed by the at least one processor, further cause the at least one processor to perform the steps of computing one or more additional movements of the robotic system to grasp the first part by the second robot in a first pose with respect to the second robot that differs from a second pose that the part is grasped with respect to the first robot, and causing the robotic system to perform the one or more additional movements.

13. The one or more non-transitory computer-readable storage media of clauses 11 or 12, wherein computing the one or more additional movements comprises performing a search of a graph, and each node of the graph represents one of the first robot or the second robot grasping the first part in a different pose.

14. The one or more non-transitory computer-readable storage media of any of clauses 11-13, wherein the instructions, when executed by the at least one processor, further cause the at least one processor to perform the steps of receiving additional sensor data associated with the first part, and executing, based on the additional sensor data, a second machine learning model that predicts a pose proposal associated with the first pose of the first part with respect to the first robot.

15. The one or more non-transitory computer-readable storage media of any of clauses 11-14, wherein the second machine learning model comprises a semantic segmentation neural network.

16. The one or more non-transitory computer-readable storage media of any of clauses 11-15, wherein the robotic system comprises a first robot, the first part is grasped by the first robot in a first pose, and the instructions, when executed by the at least one processor, further cause the at least one processor to perform the steps of computing one or more additional movements of the robotic system to re-grasp the first part by the first robot in a second pose, and causing the robotic system to perform the one or more additional movements.

17. The one or more non-transitory computer-readable storage media of any of clauses 11-16, wherein the instructions, when executed by the at least one processor, further cause the at least one processor to perform the step of training the first machine learning model based on a training set of sensor data associated with one or more computer-aided design (CAD) models of parts and one or more grasp proposals associated with the one or more CAD models.

18. The one or more non-transitory computer-readable storage media of any of clauses 11-17, wherein the instructions, when executed by the at least one processor, further cause the at least one processor to perform the step of generating each grasp proposal included in the one or more grasp proposals associated with the one or more CAD models based on one or more user-specified graspings of a CAD model included in the one or more CAD models.

19. The one or more non-transitory computer-readable storage media of any of clauses 11-18, wherein the first part is closer in height to the robotic system than one or more other parts of the one or more parts.

20. In some embodiments, a system comprises one or more memories storing instructions, and one or more processors that are coupled to the one or more memories and, when executing the instructions, are configured to receive sensor data associated with one or more parts, execute, based on the sensor data, a first machine learning model that predicts one or more grasp proposals associated with the one or more parts, wherein each grasp proposal indicates a region of one of the one or more parts that the robotic system can grasp, cause the robotic system to grasp a first part included in the one or more parts based on the one or more grasp proposals, compute one or more movements of the robotic system to assemble the first part with one or more other parts, and cause the robotic system to perform the one or more movements. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling a robotic system, the method comprising:

receiving sensor data associated with one or more parts;

executing, based on the sensor data, a first trained machine learning model that predicts one or more grasp proposals associated with the one or more parts, wherein each grasp proposal indicates a region of one of the one or more parts that the robotic system can grasp, wherein the robotic system comprises a first robot and a second robot;

causing the first robot to grasp a first part in a first pose based on the one or more grasp proposals, wherein the first part is included in the one or more parts;

receiving additional sensor data associated with the first part;

executing, based on the additional sensor data, a second trained machine learning model that predicts a pose proposal associated with a second pose of the first part;

in response to determining that the grasping of the first part in the first pose does not allow the first part to be assembled with the one or more parts, computing one or more movements of the robotic system to grasp the first part in the second pose by the first robot or the second robot, wherein the second pose of the first part is different than the first pose of the first part;

determining one or more additional movements of the robotic system to assemble the first part with the one or more other parts; and causing the robotic system to perform the one or more movements and the one or more additional movements.

2. The computer-implemented method of claim 1, wherein computing the one or more movements comprises performing a search of a graph, and each node of the graph represents one of the first robot or the second robot grasping the first part in a different pose.

3. The computer-implemented method of claim 1, further comprising training the second trained machine learning model based on training data that includes (i) sensor data associated with a computer-aided design (CAD) model that represents the first part being grasped in a plurality of poses, and (ii) a plurality of pose proposals that each represents the first part being grasped in a different pose included in the plurality of pose proposals.

4. The computer-implemented method of claim 1, further comprising training the first trained machine learning model based on a training set of sensor data associated with one or more computer-aided design (CAD) models of a plurality of parts and one or more grasp proposals associated with the one or more CAD models.

5. The computer-implemented method of claim 4, further comprising generating each grasp proposal included in the one or more grasp proposals associated with the one or more CAD models based on one or more user-specified graspings of a CAD model included in the one or more CAD models.

6. The computer-implemented method of claim 1, wherein causing the robotic system to grasp the first part comprises:

computing a principal component analysis of a first grasp proposal, included in the one or more grasp proposals, that corresponds to the first part; and determining how fingers of the robotic system can grasp the first part based on the principal component analysis.

7. The computer-implemented method of claim 1, wherein the one or more movements of the robotic system are computed based on results of one or more motion planning operations.

8. The computer-implemented method of claim 1, wherein the sensor data comprises depth data.

9. The computer-implemented method of claim 1, further comprising, prior to executing the first trained machine learning model, generating a height map associated with the one or more parts based on the sensor data, wherein the height map specifies a height of the one or more parts from a plane behind the one or more parts, wherein the first trained machine learning model is executed further based on the height map.

10. One or more non-transitory computer-readable storage media including instructions that, when executed by at least one processor, cause the at least one processor to perform steps for controlling a robotic system, the steps comprising:

receiving sensor data associated with one or more parts;

executing, based on the sensor data, a first trained machine learning model that predicts one or more grasp proposals associated with the one or more parts, wherein each grasp proposal indicates a region of one of the one or more parts that the robotic system can grasp, wherein the robotic system comprises a first robot and a second robot;

causing the first robot to grasp a first part in a first pose based on the one or more grasp proposals, wherein the first part is included in the one or more parts;

receiving additional sensor data associated with the first part;

executing, based on the additional sensor data, a second trained machine learning model that predicts a pose proposal associated with a second pose of the first part;

in response to determining that the grasping of the first part in the first pose does not allow the first part to be assembled with the one or more parts, computing one or more movements of the robotic system to grasp the first part in the second pose by the first robot or the second robot, wherein the second pose of the first part is different than the first pose of the first part;

determining one or more additional movements of the robotic system to assemble the first part with the one or more parts; and causing the robotic system to perform the one or more movements and the one or more additional movements.

11. The one or more non-transitory computer-readable storage media of claim 10, wherein computing the one or more movements comprises performing a search of a graph, and each node of the graph represents one of the first robot or the second robot grasping the first part in a different pose.

12. The one or more non-transitory computer-readable storage media of claim 10, wherein the second trained machine learning model comprises a semantic segmentation neural network.

13. The one or more non-transitory computer-readable storage media of claim 10, wherein the instructions, when executed by the at least one processor, further cause the at least one processor to perform the step of training the first trained machine learning model based on a training set of sensor data associated with one or more computer-aided design (CAD) models of parts and one or more grasp proposals associated with the one or more CAD models.

14. The one or more non-transitory computer-readable storage media of claim 13, wherein the instructions, when executed by the at least one processor, further cause the at least one processor to perform the step of generating each grasp proposal included in the one or more grasp proposals associated with the one or more CAD models based on one or more user-specified graspings of a CAD model included in the one or more CAD models.

15. The one or more non-transitory computer-readable storage media of claim 10, wherein the first part is closer in height to the robotic system than one or more other parts of the one or more parts.

16. A robotic system comprising:

one or more memories storing instructions; and one or more processors that are coupled to the one or more memories and, when executing the instructions, are configured to:

receive sensor data associated with one or more parts, execute, based on the sensor data, a first trained machine learning model that predicts one or more grasp proposals associated with the one or more parts, wherein each grasp proposal indicates a region of one of the one or more parts that the robotic system can grasp, wherein the robotic system comprises a first robot and a second robot;

cause the first robot to grasp a first part in a first pose based on the one or more grasp proposals, wherein the first part is included in the one or more parts;

receive additional sensor data associated with the first part;

execute, based on the additional sensor data, a second trained machine learning model that predicts a pose proposal associated with a second pose of the first part;

in response to determining that the grasping of the first part in the first pose does not allow the first part to be assembled with the one or more parts, compute one or more movements of the robotic system to grasp the first part in the second pose by the first robot or the second robot, wherein the second pose of the first part is different than the first pose of the first part;

compute one or more additional movements of the robotic system to assemble the first part with the one or more parts; and cause the robotic system to perform the one or more movements and the one or more additional movements.

* * * * *